United States Patent
Livengood

(10) Patent No.: US 8,042,874 B2
(45) Date of Patent: Oct. 25, 2011

(54) INSULATING COVER FOR FLAMMABLE CUSHIONING MATERIALS

(75) Inventor: Edward Thomas Livengood, Winston-Salem, NC (US)

(73) Assignee: BE Aerospace, Inc., Wellington, FL (US)

(*) Notice: Subject to any disclaimer, the term of this patent is extended or adjusted under 35 U.S.C. 154(b) by 285 days.

(21) Appl. No.: 12/329,783

(22) Filed: Dec. 8, 2008

(65) Prior Publication Data

US 2010/0327648 A1    Dec. 30, 2010

Related U.S. Application Data

(60) Provisional application No. 61/012,820, filed on Dec. 11, 2007.

(51) Int. Cl.
*A47C 7/18* (2006.01)
*A47C 7/20* (2006.01)

(52) U.S. Cl. ............... 297/452.61; 297/452.58

(58) Field of Classification Search ............ 297/452.58, 297/452.61
See application file for complete search history.

(56) References Cited

U.S. PATENT DOCUMENTS

| | | | |
|---|---|---|---|
| 4,060,280 A * | 11/1977 | Van Loo | 297/452.61 |
| 4,463,465 A | 8/1984 | Parker et al. | |
| 4,736,911 A * | 4/1988 | Heitmann | 244/122 R |
| 4,743,495 A | 5/1988 | Lilani et al. | |
| 4,793,574 A * | 12/1988 | Fenske et al. | 244/122 R |
| 5,085,487 A * | 2/1992 | Weingartner et al. | 297/452.1 |
| 5,149,582 A | 9/1992 | LaMarca, II et al. | |
| 5,248,185 A * | 9/1993 | Weingartner et al. | 297/452.58 |
| 5,487,799 A | 1/1996 | Tsukada | |
| 5,632,053 A | 5/1997 | Weingartner et al. | |

* cited by examiner

*Primary Examiner* — Rodney B White
(74) *Attorney, Agent, or Firm* — Oliff & Berridge, PLC

(57) ABSTRACT

An insulating cover for a cushioning material for providing a barrier against heat and flame, the insulating cover comprising at least one layer of aluminum film or ceramic fabric, at least one layer of fire-blocking material, and at least one layer of adhesive, wherein the insulating cover is flexible so as to conform to and move with an underlying cushioning material. The insulating cover may be positioned between a cushion and the protective fabric of an aircraft passenger seat.

11 Claims, 2 Drawing Sheets

INSULATING COVER FOR FLAMMABLE CUSHIONING MATERIALS

CROSS-REFERENCE TO RELATED APPLICATION

This application claims priority to U.S. Provisional Patent Application No. 61/012,820 filed Dec. 11, 2007 by Livengood and entitled "FLEXIBLE RADIANT INSULATING ASSEMBLY FOR HEAT RELEASE AND SMOKE DENSITY PROTECTION," the contents of which are incorporated by reference herein.

FIELD OF THE INVENTION

The present invention relates generally to the field of insulating flammable materials against high temperatures and flame in order to prevent those materials from igniting and releasing smoke, and more particularly, to an insulating arrangement for a vehicle seat include a plurality of flame-resistant layers arranged to provide a flexible encapsulating cover for flammable seat materials.

BACKGROUND OF THE INVENTION

Vehicle seats, such as aircraft seats, typically include a frame defining seat back and bottom portions for supporting the seat occupant. To provide comfort to the seat occupant, at least the back and bottom portions are typically covered with some type of resilient cushioning material, such as foam and like materials. To protect the foam against wear and damage, the cushioning material is typically covered with a robust fabric that moves with and contours to the shape of the foam. The fabric covering may also function to maintain the cushioning material in place and may be patterned or colored to provide decoration to the seat.

For safety and fire prevention, it is not uncommon for the fabric covering to be made from or treated with a flame-retardant material in order to decrease the flammability of the covering and the cushioning material beneath it. However, conventionally treated fabrics are not able to adequately insulate the underlying cushioning materials from radiant heat flux resulting from a fire within the passenger compartment. As a result, cushioning materials exposed to sufficient heat flux can cause the materials to ignite and/or release smoke and fumes. The contribution of heat, flame and smoke density to the cabin atmosphere from additional burning materials increases the rate at which the fire spreads and decreases the time in which passengers have to escape.

Federal Air regulation 25.853(d) details testing requirements for determining the acceptability of materials utilized in aircraft interiors. Regulation 25.853(d) includes two separate tests: (1) the OSU Rate of Heat Release Test, and; (2) the Smoke Density Test. The OSU Rate of Heat Release Test involves exposing aircraft interior cabin materials to incident radiation heat flux, and measuring the rate at which a burning item releases heat. The OSU test can be used to determine at what temperature certain interior materials will ignite, thus starting a fire or contributing to the spreading of an existing fire. The second test, the Smoke Density Test, is used to measure and observe the relative amounts or density of smoke produced when a material is burned. This test is also useful in determining the smoke contribution of a burning material to the aircraft cabin atmosphere and the decrease in visibility that occupants will encounter in exiting the passenger compartment during a fire.

Conventional materials often have difficulty in meeting the requirements of these tests. Generally, foams and other flammable materials used in cushions and protective pads on aircraft seats and other furniture and partitions do not perform well in one or both of these tests unless the material itself has been treated with or constructed from flame retardant additives.

Accordingly, it would be desirable to provide an insulating layer between a flammable material and high temperatures in a passenger compartment, thus protecting the material and decreasing its hazard potential. Further, it would be desirable to provide a layered insulating cover for flammable cushioning materials to shield the materials from heat flux that could cause the materials to ignite and/or contribute smoke to the cabin environment. A desirable insulating cover would be flexible so as not to reduce the comfort of the cushioning material, and would obviate the need to treat or construct the cushioning material using flame-retardant additives or materials.

BRIEF SUMMARY OF THE INVENTION

In one aspect, an insulating cover is provided for decreasing the hazard potential of underlying materials.

In another aspect, an insulating cover is provided for substantially surrounding or encapsulating flammable material.

In yet another aspect, an insulating cover is provided for positioning between a fabric seat cover and a flammable cushioning material to insulate the material from heat flux that could cause the material to ignite and/or give off smoke.

In yet another aspect, an insulating cover for flammable material is provided that is sufficiently flexible such that it conforms to and moves with the underlying flammable material as well as a covering fabric.

In yet another aspect, an insulating cover for a seat cushion is provided that minimally reduces the comfort provided by the cushion.

In yet another aspect, an insulating cover for an aircraft passenger seat cushion, a padded partition or another padded structure is provided including a plurality of various types of fire blocking material arranged upon one another.

To achieve the foregoing and other aspects and advantages of the present invention, an insulating cover for flammable materials is provided. Throughout the embodiments, the insulating cover is positioned between the flammable material and the heated environment, and partially or substantially surrounds or encapsulates the flammable material. Thus, the insulating cover functions as a barrier between the flammable material and heat and flame. In a particular embodiment, the insulating cover is arranged over the flammable material and beneath a protective, decorative fabric cover. In exemplary applications, the insulating cover may be positioned between a protective fabric and a seat cushion, between a protective fabric and a partition pad, or arranged on any other flammable material. The insulating cover is preferably flexible so as to conform to, move with and not detract from the comfort of the seat or padded surface.

In one embodiment, the insulating cover includes a plurality of layers arranged symmetrically about an aluminum film or ceramic fabric material layer. In alternative embodiments, the layered arrangement may be non-symmetric about the aluminum film or ceramic fabric. In additional embodiments, the layered insulating arrangement includes stacking multiple layers of aluminum film or ceramic material, adhesive and fire-blocking material. In another embodiment, the insulating assembly includes a predetermined number of stacked layers of aluminum film or ceramic fabric and fire-blocking material secured together with an adhesive. In alternative embodiments, multiple layers of aluminum film, ceramic fabric, and fire-blocking material may be stacked directly upon each other to achieve a desired level of insulation. Thus, the embodiments herein provide varying layered arrangements of insulting materials and fire-blocking materials that can be arranged in a number of ways to insulate materials from high temperatures and flame.

In another embodiment, the present invention provides a passenger seat including a seat frame defining or supporting seat back and bottom portions. To provide comfort to the seat occupant, at least the back and bottom portions are covered with a cushioning material, such as a resilient foam or like cushioning material. The cushioning materials are cover with an insulating cover including a predetermined layered arrangement of non-flammable and fire-blocking materials that may optionally be secured together with adhesive. The layered insulating cover is flexible so as to conform to, move with and cover at least a portion of the underlying cushion. The seat further includes a robust, decorative fabric cover arranged on and covering the insulating cover. The fabric cover is preferably also constructed from non-flammable material. In an alternative embodiment, the top layer of the insulating cover adjacent the seat occupant is a decorative fabric to obviate the need for a separately applied and independent fabric covering. In various embodiments, the insulating covers includes layers of aluminum film or ceramic fabric and fire-blocking material.

Additional features and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

Figure 1:
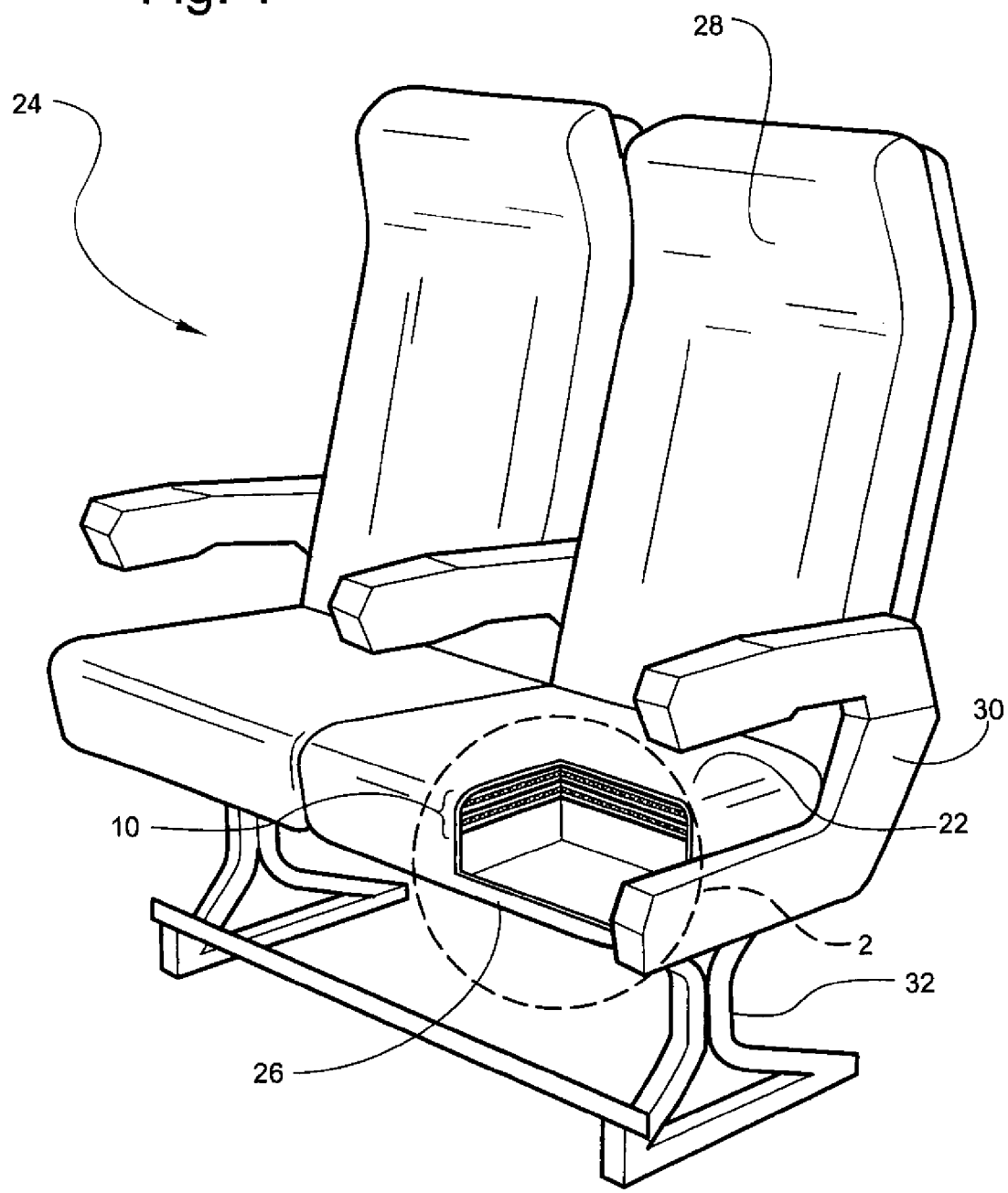
FIG. 1 is a cutaway perspective view of an aircraft passenger seat illustrating a layered insulating cover for flammable seat material in accordance with an embodiment of the present invention.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, an insulating cover for insulating cushioning materials from high temperature and flame is generally indicated by reference numeral 10. The insulating cover 10 is a layered arrangement of materials arranged upon, substantially covering or substantially encompassing underlying flammable material for providing a barrier between the underlying material and high temperature and flame. By covering the material with an insulating cover, the non-flammability requirements of the underlying material may be relaxed, and the contribution of heat and smoke to the cabin atmosphere during a fire from cabin interior materials is reduced.

Figure 2:
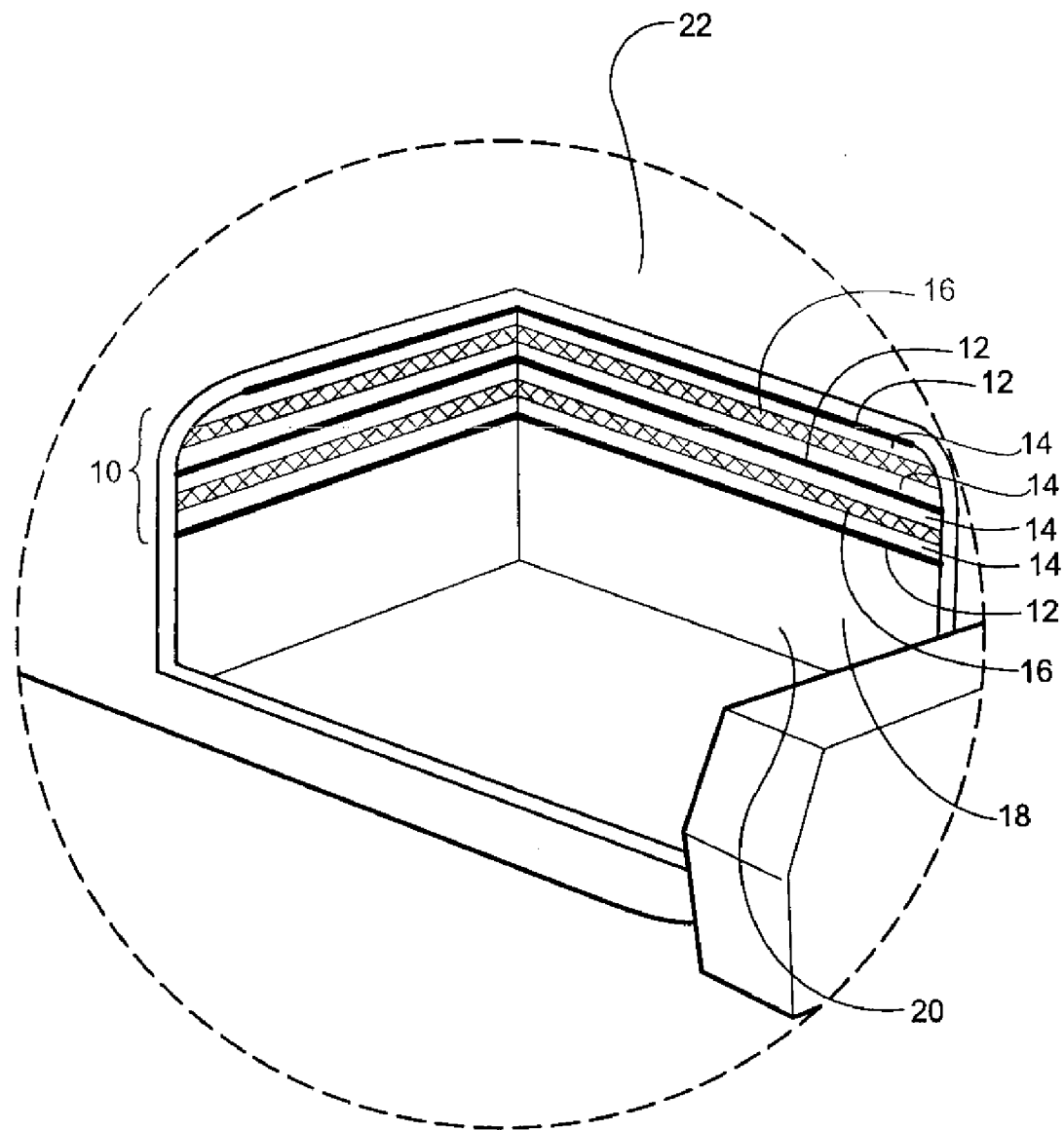
FIG. 2 is a detailed perspective view of the seat bottom portion of FIG. 1 illustrating the layered insulating cover.

Referring to FIGS. 1 and 2, exemplary passenger seats of the type typically found within a passenger compartment of an aircraft or other vehicle are generally indicated by reference numeral 24. The seats include a supportive frame defining or supporting at least generally horizontal seat bottom portion 26 and selectively reclinable seat back portion 28. The seat further includes armrests 30 for dividing passenger living space and providing arm comfort, and a plurality of legs 32 for supporting the seats in a position elevated from the floor. The seat bottom and back portions 26 and 28 support the seat occupant in a comfortable seated position. To further provide passenger comfort, at least the bottom and back portions are typically covered with a cushioning material 18, such as a resilient polyurethane foam seat cushion 20 or like material. The cushion is shaped to contour to the seat occupant. The cushion is typically covered with a robust, decorative fabric cover 22 to maintain the cushion in place, protect the cushion from impact damage and wear, and decorate the seat. The fabric may be treated with an anti-soil treatment to facilitate cleaning and maintain its appearance, and may also be treated with a flame-retardant or constructed with flame-retardant additives to prevent burning, smoke and fume release.

As shown, the insulating cover 10 is positioned between the fabric cover 22 and the seat cushion 20. The insulating cover 10 may be arranged on the surface of the cushion 20 as shown, or in alternative embodiments, may partially, substantially or entirely encompass the seat cushion. The insulating cover 10 may be utilized anywhere in the aircraft interior in which it is desired to insulate materials from heat flux and flame. With regard to seats, the insulating cover 10 may be secured to at least one of the seat back and bottom cushions using an adhesive, may be sewn to fit over and held by the cushion, or may be held in place by the fabric cover 22. The insulating cover 10 may also be utilized in padded partitions and other structures.

The insulating cover 10 includes at least one aluminum film or ceramic fabric layer 12, at least one fire-blocking layer 14, and at least one adhesive layer 16. A suitable example of aluminum film includes, but is not limited to, about 0.001 inch aluminum film or sheet. Suitable examples of ceramic fabric include, but are not limited to, ceramic textiles, ceramic fibre yarns, ceramic fiber yarns reinforced with wire or glass filament, woven ceramic fabrics and the like that serve as a thermal barrier. Ceramic textiles offer high temperature protection and are lightweight and durable. Further, aluminum film and ceramic fabric are flexible. Suitable examples of fire-blocking materials include, but are not limited to, fire retardant materials, silicone foams of varying thickness, silicone applied to fiberglass, fire-blocking gels and the like for resisting burnthrough and reducing the spread of flames to other areas. Suitable examples of adhesives include, but are not limited to, pressure-sensitive adhesives, Fastbond™, Aquabind™ and like adhesives. Adhesives used herein function to prevent the movement of one insulating layer with respect to another, and may also be used to prevent the movement of an insulating layer relative to the protective fabric or foam. Aluminum film, ceramic fabric, fire-blocking and adhesive materials utilized herein are preferably chosen to emit no or extremely low levels of smoke or toxic gas when subjected to heat or flame. Fire-blocking materials utilized herein preferably meet U.S. Federal Government regulations for the aviation sector.

As shown, the flexible radiant insulating cover 10 includes multiple layers of aluminum film or ceramic fabric layers 12, fire-blocking materials 14 and adhesive layers 14 arranged symmetrically about an aluminum film or ceramic fabric material layer 12. In alternative embodiments envisioned herein, the layers may be non-symmetrically arranged. Multiple layers of aluminum film or ceramic fabric, adhesive and fire-blocking material may be stacked to achieve a predetermined insulating layer thickness. The insulating cover 10 preferably includes the aluminum film or ceramic fiber layers 12 positioned adjacent the protective fabric covering 22 and the seat cushion 20, with additional layers of aluminum film or ceramic fabric, fire-blocking material and adhesive arranged therebetween. The fabric covering 22 and seat cushion 20 or other flammable material may optionally include flame retardant coverings or additives that would strengthen/relax the insulating requirements of the insulting cover 10. A single layer of aluminum film or ceramic fabric may be arranged on a fire-blocking layer to form an insulating layer. Insulating layers may be secured together using an adhesive layer. Layers may be stacked in any number.

In the specific layered arrangement shown, the insulating cover 10 includes materials arranged from the top of the seat bottom down in the following order: (1) aluminum film or ceramic fabric; (2) fire-blocking material; (3) adhesive; (4) fire-blocking material; (5) aluminum film or ceramic fabric; (6) fire-blocking material; (7) adhesive; (8) fire-blocking material; and (9) aluminum film or ceramic fabric. In an alternative arrangement, the materials are arranged in the following order: (1) aluminum film or ceramic fabric; (2) adhesive; (3) fire-blocking material; (4) adhesive; (5) aluminum film or ceramic fabric; (6) adhesive; (7) fire-blocking material; (8) adhesive; and (9) aluminum film or ceramic fabric. It is envisioned that the layers may be arranged in additional orders, and may include adjacent layers of the same material to increase/relax fire and heat blocking.

The insulating cover 10 is sufficiently flexible so as to follow the contour of and move along with the underlying cushion without detracting from the comfort provided by the underlying cushion. The built thickness and number of layers of the insulating cover 10 may be increased/decreased based on the flammability and location of the materials being insulated. The insulting cover thickness may be dependent upon the type, surface area, thickness and position of the flammable material within the environment. For example, a passenger seat having a predetermined amount of foam material may require one insulating layer thickness based on the proximity to passengers, the potential heat that the foam may be subjected to, and the need for controlling the amount of smoke in the passenger compartment. A non-passenger carrying portion of the aircraft or partition may require a lesser amount of insulating material or reduced layer thickness due to the distance from passengers.

An insulating cover for insulating flammable materials from heat flux and flame is described above. While the insulating cover has been described with reference to aircraft and passenger compartment components, it is envisioned that the insulating cover or components thereof may be used to insulate other flammable materials found elsewhere, such as other vehicles and floor coverings, wall coverings, insulation, cargo compartment liners, air ducts, trim strips as well as molded parts. Various details of the invention may be changed without departing from the scope of the invention. Furthermore, the foregoing description of the preferred embodiments of the invention and best mode for practicing the invention are provided for the purpose of illustration only and not for the purpose of limitation.

What is claimed is:

1. An insulating cover for a cushioning material for providing a barrier against heat and flame, comprising:
    at least one layer selected from the group consisting of aluminum film and ceramic fabric;
    at least one layer of fire-blocking material; and
    at least one layer of adhesive;
    wherein the at least one layer selected from the group consisting of aluminum film and ceramic fabric is arranged on the at least one layer of fire-blocking material to form an insulating layer;
    wherein multiple insulating layers are secured together with the at least one layer of adhesive; and
    wherein the insulating cover is flexible so as to conform to and move with an underlying cushioning material.

2. The insulating cover in accordance with claim 1, wherein the insulating cover is positioned between a cushioning material and a fabric covering.

3. The insulating cover in accordance with claim 1, wherein the ceramic fabric is selected from the group consisting of ceramic textiles, ceramic fibre yarns, ceramic fiber yarns reinforced with wire or glass filament and woven ceramic fabrics.

4. The insulating cover in accordance with claim 1, wherein the fire-blocking material is selected from the group consisting of fire retardant material, silicone foams of varying thickness, silicone applied to fiberglass and fire-blocking gels.

5. The insulating cover in accordance with claim 1, wherein the insulating cover covers a portion of the underlying cushioning material.

6. The insulating cover in accordance with claim 1, wherein the insulating cover covers substantially all of the underlying cushioning material.

7. A passenger seat, comprising:
    a seat bottom portion supported by a frame and including a cushion and a fabric covering;
    a seat back portion supported by the frame and including a cushion and a fabric covering; and
    an insulating cover positioned between at least one of the seat bottom cushion and the fabric covering, and the seat back cushion and the fabric covering, the insulating cover comprising at least one layer selected from the group consisting of aluminum film and ceramic fabric, at least one layer of fire-blocking material, and at least one layer of adhesive;
    wherein the at least one layer selected from the group consisting of aluminum film and ceramic fabric is arranged on the at least one layer of fire-blocking material to form an insulating layer;
    wherein multiple insulating layers are secured together with the at least one layer of adhesive; and
    wherein the insulating cover is flexible so as to conform to and move with the underlying cushion.

8. The passenger seat in accordance with claim 7, wherein the ceramic fabric is selected from the group consisting of ceramic textiles, ceramic fibre yarns, ceramic fiber yarns reinforced with wire or glass filament and woven ceramic fabrics.

9. The passenger seat in accordance with claim 7, wherein the fire-blocking material is selected from the group consisting of fire retardant material, silicone foams of varying thickness, silicone applied to fiberglass and fire-blocking gels.

10. The passenger seat in accordance with claim 7, wherein the insulating cover covers a portion of the underlying cushion.

11. The passenger seat in accordance with claim 7, wherein the insulating cover covers substantially all of the underlying cushion.

* * * * *